April 28, 1970 P. J. HEINLE ET AL 3,508,434
MINIMUM VISCOSITY AS A TEST CRITERION FOR MOLDING COMPOUNDS
Filed July 12, 1967

PRESTON J. HEINLE
MICHAEL A. RODGERS
INVENTORS

BY *Mueller Aichele & Rauner*

United States Patent Office 3,508,434
Patented Apr. 28, 1970

3,508,434
MINIMUM VISCOSITY AS A TEST CRITERION FOR MOLDING COMPOUNDS
Preston Joseph Heinle, Phoenix, and Michael Aaron Rodgers, Tempe, Ariz., assignors to Motorola, Inc., Franklin Park, Ill., a corporation of Illinois
Filed July 12, 1967, Ser. No. 652,913
Int. Cl. G01n 11/04
U.S. Cl. 73—56                                     9 Claims

ABSTRACT OF THE DISCLOSURE

A method of selecting thermosetting plastic molding compounds suitable for use in a particular mold wherein the thermosetting plastic compound is subjected to a molding test which senses and indicates the ram velocity and ram position with respect to elapsed time of a transfer press which is associated with a test mold. The ram velocity and ram position signals are then converted into dynamic viscosity. The dynamic viscosity value of the test sample is then compared with an acceptable dynamic viscosity value for an acceptable thermosetting plastic molding compound to determine the suitability of the test sample for molding in the particular mold.

BACKGROUND OF THE INVENTION

This invention relates to the testing of molding compounds especially thermosetting compounds for use in a particular mold.

To date the design of molds for use with molding compounds require extensive testing to ensure that the flow length is sufficient to fill all of the cavities in the mold. In testing compounds to see if they are acceptable for a particular mold the production mold must be used to ensure that in a production run all of the cavities are filled. This means the usage of production equipment in incoming quality control testing procedure. This procedure is expensive because it ties up production equipment.

At the present time there is no known way to design molds for specific molding compounds. Correspondingly each molding compound, varying from lot to lot of production, has to be tested in the production equipment to ensure that the production run will be satisfactory.

SUMMARY OF THE INVENTION

It is an object of this invention to provide a technique of quality control type testing utilizing the minimum viscosity of a molding compound as a criterion.

It is another object of this invention to provide a novel process for the determination of minimum viscosity of thermosetting molding compounds.

Methods utilizing the present invention include the feature of a viscosity measurement utilizing a spiral flow mold in which the ram position and velocity are measured for indicating instantaneous viscosity. The instantaneous viscosity is plotted and the minimum viscosity then read off from the plot. An apparatus for determining minimum viscosity includes the features of a differentiator with known flow length and a comparator which determines the minimum viscosity and compares the measured minimum viscosity with a standard range of minimum viscosity for determining acceptance or rejection.

THE DRAWING

DESCRIPTION OF THE ILLUSTRATIVE EMBODIMENT

Figure 1:
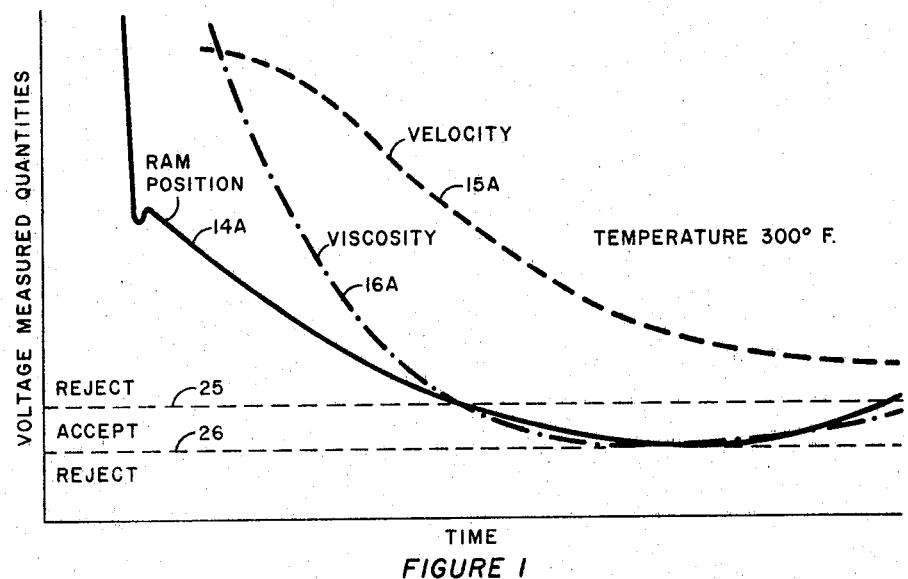
FIG. 1 is a graph illustrating various quantities used in the determination of minimum viscosity and illustrating an acceptance range of molding compounds using viscosity as a criterion.
Figure 2:
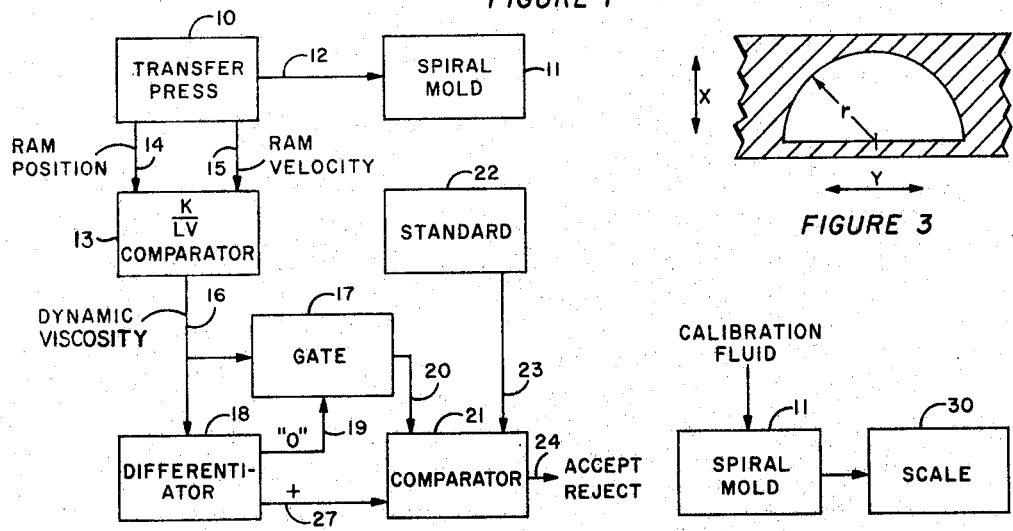
FIG. 2 is a block diagram of a system usable to measure the minimum viscosity of a thermosetting molding compound wherein the flow length is known before the viscosity is determined.

Referring first to FIG. 2 there is shown a system usable to measure minimum viscosity of a thermosetting molding compound in which the total flow length is known before the viscosity is determined. Relationship of this system to other techniques in which the total flow length is not known will be described under the section entitled "Theory of Operation." Description of the operation of the FIG. 2 embodiment is explained with particular reference to FIG. 1 wherein the graph shows the instantaneous status of the system.

Figure 3:
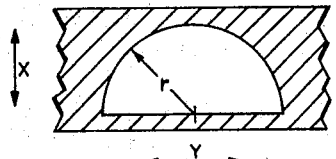
FIG. 3 is a partial schematic cross-sectional view of a Hull mold.

In the FIG. 2 system there is a transfer press 10 connected to a Hull spiral mold 11 with the ram connection indicated schematically by arrow 12. It is understood that press 10 and mold 11 may be any known equipment and operates in a known manner. Comparator 13 designed to solve the equation $k/LV$ is connected to transfer press 10 and receives input signals therefrom over lines 14 and 15 which respectively indicate ram position and ram velocity in a known manner. In comparator 13 the term L is indicated by the ram positional signal on line 14 while velocity is indicated by the letter V and the letter $k$ represents the constant which is determined by the characteristics of transfer press 10 and mold 11. For example, the constant $k$ may be the product $cPr^2$ wherein $c$ is a mold 11 characteristic which may be a constant equal to 0.08541, as later described, P is the pressure drop in thermold which can be held constant by operating press 10 in a known manner, $r$ is the radius of the semicircular cross section of mold 11, as best seen in FIG. 3. It is known that the Hull spiral mold may be an Archimedes' spiral wherein the ram forces the thermosetting compound from the inner end of the spiral toward the radial outward end.

In a typical operation of the FIG. 2 embodiment the ram position signal is indicated by line 14A in FIG. 1 while the velocity signal is indicated by line 15A. Comparator 13 receives the ram position and velocity signals and converts them with the mold constant $k$ to determine the dynamic or instantaneous viscosity of a molding compound, indicated by signal on line 16, the amplitude of which is indicated by line 16A in the FIG. 1 graph. From inspection of FIG. 1 it is seen that the viscosity decreases to a minimum value and then increases as the molding compound hardens or sets. Minimum viscosity corresponds to maximum fluidity of the molding compound during the molding operation and, therefore, is a determining factor in the total flow length of the molding compound within the mold.

The instantaneous dynamic viscosity signal on line 16 is supplied to the differentiator 18 of known design. Differentiator 18 supplies a signal over line 19 whenever the differential instantaneous viscosity (maxima or minima are reached) indicated by line 16A is substantially zero. By definition, a zero is arbitrarily indicated with a viscosity change of less than ±2½%. Signal 19 opens gate 17 for passing the dynamic viscosity signal on line 16 to line 20. This dynamic viscosity signal indicates viscosity between lines 25 and 26, for example (FIG. 1).

The dynamic viscosity signal on line 20 is supplied t a second comparator 21 which receives a standard viscosity indicating signal over line 23 from source 22. Comparator 21 is constructed in a known manner such that when the dynamic viscosity signal on line 20 is within range 25, 26 of FIG. 1 as set forth by the standard signal, an acceptance signal will be supplied over line 24. Whenever the indicated minimum viscosity is outside the range 25, 26 (which may represent a 10% variation in readings, i.e., ±5% from the standard indication when measured in centipoise) a reject signal is supplied over line 24. For example, the signal on line 24 may be a binary signal; any relatively positive signal to indicate acceptance, any relatively negative signal to indicate rejection, no limitation thereto intended. Additionally differentiator 18 may supply a signal over line 27 whenever it detects that the viscosity is increasing as indicated by the plus symbol on line 27. This may be used to actuate comparator 21. For example, comparator 21 may have a gate (not shown) therein which is opened by the signal on line 27 for passing the comparison signal to line 24. Other control arrangements may be provided in comparator 21, the selection of which is a matter of design choice and not important to the practice of the present invention. An important feature being that the indicated minimum dynamic viscosity on line 20 is compared with the standard range supplied by a source 22.

Figure 4:
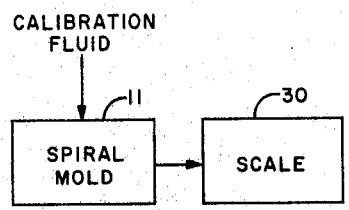
FIG. 4 is a block flow diagram of a system usable to calibrate a Hull spiral mold. Calibration is not necessary to practice this invention but it provides a knowledge of the accuracy of the measurement system.

When using the system of FIG. 2 with a Hull spiral mold for determining minimum viscosity, the indication of line 24 may be used to accept or reject molding compounds for use with molds other than a spiral mold. In so using a Hull spiral mold it is preferred that the mold characteristics, c be determined theoretically from known equations of motion. However, the constant may be determined as indicated in FIG. 4. There are available calibration fluids of known viscosities. Such calibration fluids may be used in transfer press 10 and forced through spiral mold 11 for determining a standard of measurement for mold 11. The characteristic is determined by causing the calibration fluid to flow through spiral mold 11 for a predetermined time and catching the fluid in a container on a scale 30. After a set time the fluid in container 30 is weighed and from this arrangement the characteristics of the mold can be calculated, as will be described.

The characteristic c represents the rate of displacement of the calibration fluid through mold 11. It should be noted that the fluid having a known viscosity will have a known flow length, i.e., the actual length of mold 11. The velocity through the mold is determined by weighing the standard fluid in scale 30. The pressure drop is determined in the transfer press in a known manner. The radius $r$ of mold 11 is known, therefore all the criteria for determining mold characteristics are available and can be used as described under Theory of Operation.

Subsequent to the calibration of the mold the molding compounds will have different flow lengths unless the charge of the molding compound is kept small which always provides a known flow length. Before using the system of FIG. 2 the total flow length must be first known. The invention may be used wherein the total flow length is not known, however, in such instances all measurements must be first made and the total flow length determined before viscosity can be determined. After this determination is made, viscosity can be measured as described under Theory of Operation. The signal comparison is made in the comparators by inserting a new constant $k$ in comparator 13. Such a system requires a memory for recording ram position and ram velocity and utilizing the two quantities and the total length indication to determine minimum viscosiy. For example, in measuring minimum viscosity wherein the total length is not known before measurement molding press 10 is still equipped with velocity and ram displacement transducers to obtain chart data according to lines 14A and 15A in FIG. 1. The ram velocity and ram displacement signals can be first converted to flow velocity, V, an instantaneous length, L from a knowledge of the geometrical relationships and the total flow length $L_t$. In analyzing the data, for example, a ram having a diameter of 1.75 inches and a spiral having a semicircular mold cavity with a radius of 0.0625 inch then the relationship between instantaneous flow and ram displacement is theoretically:

$$L = L_t - 392D \quad (1)$$

In the above equation L is the instantaneous flow length, $L_t$ is the total flow length and D is ram displacement. In practice, because of machining tolerances, the constant 392 turns out to be approximately 376.

It is known that velocity is the differential of length with respect to time. In differentiating the above equation we obtain:

$$\frac{dL}{dt} = -392 \frac{dD}{dt} \quad (2)$$

From the above equation, since $dL/dt = V$, velocity of the compound in the mold and ram velocity is equal to the ram displacement differentiated with respect to time, we obtain:

$$V = 392 V_r \quad (3)$$

Wherein $V_r$ is the ram velocity. After determining the compound velocity in the mold the minimum viscosity can be determined by the comparison set forth in Theory of Operation.

In using the minimum viscosity indications a greater understanding of molding phenomenon is obtained. For example, the rate of change of viscosity is a measure of the polymerization or cross-linking rate and the viscosity itself is a measure of fluidity. From this information molds may be designed and after the molds are designed the minimum viscosity can be used for accepting or rejecting molding compounds for use in such molds. Viscosity is therefore optimized for a particular mold and a device or object to be molded by selecting molding conditions to obtain desirable viscosity and polymerization rate. Therefore, minimum or characteristic viscosity is a variable which is incorporated along with flow length and flow duration as criterion for thermosetting molding compounds or plastic formulation and for molding compounds lot acceptance.

THEORY OF OPERATION

The mathematical representation of fluid flow on which the FIG. 2 system is based and on which the minimum viscosity measurement is determined wherein the total flow length is not first known is taken from the book by Bird, R. B. et al. Transport Phenomenon, Wylie, New York, 1962, page 85. This equation is the equation of motion for isothermal flow. When applying this mathematical representation to the Hull spiral mold the Z direction of the equation is along the length of the spiral, the Y direction is along the base of the semicircular cross-sectional configuration as best seen in FIG. 3 and the X component is the vertical direction perpendicular to the flow, also as best seen in FIG. 3. By assuming that the thermosetting molding compound does not move in the X and Y directions, i.e., the velocity components are equal to zero, then the Bird equation resolves to:

$$\rho \left( \frac{\partial V_z}{\partial t} + V_z \frac{\partial V_z}{\partial x} \right) = -\frac{\partial P}{\partial z} + \rho g_z - \left[ \frac{\partial \tau_{xz}}{\partial x} + \frac{\partial \tau_{yz}}{\partial y} + \frac{\partial \tau_{zz}}{\partial z} \right] \quad (4)$$

Wherein $\rho$ is the molding compound density, V is velocity of the molding compound, $t$ is time, P is differential pressure in the mold, $g$ is the force due to gravity and $\tau$ is shear stress. Then by making the assumptions that there is no effect due to gravity, that the operation is pseudo-steady state and that the velocity in the Z direction is a function of X and Y only with pressure being a function in the Z direction only and the viscosity is independent of position, i.e., there is Newtonian flow, then the Equation 4 will further simplify when the shear stress is taken as follows:

$$\tau xz = -\mu\left(\frac{\partial Vz}{\partial x}+\frac{\partial Vx}{\partial z}\right) \qquad (5)$$

is the shear stress between $x$ and $y$ directions, $$\tau yz = -\mu\left(\frac{\partial Vy}{\partial z}+\frac{\partial Vz}{\partial y}\right) \qquad (6)$$

is the shear stress between the $y$ and $z$ direction and, $$\tau zz = -\mu\left[2\frac{\partial Vz}{\partial z}-\frac{2}{3}\left(\frac{\partial Vx}{\partial x}+\frac{\partial Vy}{\partial y}+\frac{\partial Vz}{\partial z}\right)\right] \qquad (7)$$

is the shear stress in the direction of flow, where $\mu$ is viscosity.

Assuming that the velocity in the $x$ and $y$ directions is equal to 0, ignoring gravity, and substituting Equations 5, 6 and 7 for $\tau$'s Equation 4 reduces to $$\rho\left(\frac{\partial Vz}{\partial t}+Vz\frac{\partial Vz}{\partial z}\right)=-\frac{\partial P}{\partial z}+\frac{\partial\left(\frac{\mu\partial Vz}{\partial x}\right)}{\partial x}+\frac{\partial\frac{\mu\partial Vz}{\partial y}}{\partial y} \qquad (8)$$

Then assuming a pseudo-steady state and that the velocity in the $z$ direction is a function of $x$ and $y$ only, the following equation was obtained from 8:

$$\frac{\partial\left(\mu\frac{\partial V}{\partial x}\right)}{\partial x}+\frac{\partial\left(\mu\frac{\partial V}{\partial y}\right)}{\partial y}=\frac{\partial P}{\partial z} \qquad (9)$$

Then assuming that pressure is a function of $z$ only and there is a Newtonian flow, we obtained:

$$\frac{\partial^2 V}{\partial x^2}+\frac{\partial^2 V}{\partial y^2}=\frac{1}{\mu}\frac{dP}{dz}=\frac{\Delta P}{\mu L}=K \qquad (10)$$

Wherein $\Delta P$ is the pressure drop and $L$ is the instantaneous length and $K$ is a constant.

Certain boundary conditions can be assumed. We assumed that the velocity is equal to zero when $x$ is equal to zero, that is, along the flat bottom of the semicircular mold cross section as seen in FIG. 3. A second assumed boundary condition is that the velocity is equal to zero along the semicircular inner surface portion, i.e., at the locus defined by $x^2+y^2=r^2$. Another assumed boundary condition is that the change in velocity with a change in Y is equal to zero when $y$ is zero. The third boundary condition in other words, represents that fluid flow (and therefore shear stress) in the mold is symmetrical along the width of the mold, that is, the velocity is maximum at a plane down the center of the mold represented by the arrow $x$ in FIG. 3.

Equation 10 was then put in the following numerical form in order to obtain a solution of the velocity profiles:

$$V_{ij}=\frac{(V_{i+1,j}+V_{i-1,j}+V_{i,j+1}+V_{i,j-1}-h^2K)}{4} \qquad (11)$$

Wherein $V_{ij}$ is the velocity at point $ij$ in the mold, K is a constant, $-10^5$ in. 1 sec. (an arbitrary selection), $h$ is the grid location spacing as being equal to $r/50$ and $j$ and $i$ are points along the grid in the $x$ and $y$ directions with the locus $X^2+Y^2=r^2$ being a boundary value.

The mold constant C was determined based upon average velocity. Average velocity was determined by integrating Equation 11 and then averaging velocity over the mold cross-sectional area, A, by the equation:

$$V_{avg}=\frac{1}{A}h^2V_{ij} \qquad (12)$$

Then the determination of viscosity from the press measurements when total length is not initially known is as follows:

Equation 1:
$$L=L_t-392D \qquad (1)$$

Equation of comparator 13:
$$\mu=k/LV \qquad (13)$$

Substituting 1 into 13:
$$\mu=\frac{k}{(L_t-392D)V} \qquad (14)$$

Since $k=cPr^2$
$$\mu=\frac{cPr^2}{(L_t-393D)V} \qquad (15)$$

Using average velocity Equation 12
$$\mu=\frac{cPr^2}{(L_t-392D)\left(\frac{1}{A}h^2V_{ij}\right)} \qquad (16)$$

Equation 16 may be used as a basis to determine viscosity where total flow length is not first known. Minimum viscosity is determinable from 16 by measuring the variables in the equations, i.e., P, $L_t$ D and $V_{ij}$.

We claim:

1. A method of selecting thermosetting plastic molding compounds for a particular mold and molding operation to be performed, having a ram used to force compound into a mold including the following steps in combination,
    subjecting a thermosetting plastic molding compound sample to a test molding operation for sensing and indicating ram velocity and ram position with respect to elapsed time,
    converting said indications with a preprogrammed constant into a dynamic viscosity indication, and
    comparing said dynamic viscosity indications with a standard indication, and indicating acceptance of the molding compound under test when said viscosity indications approximates said standard indication.

2. The method of claim 1 wherein said minimum viscosity is indicated only when changes in said dynamic viscosity indication is not greater than 2½ percent.

3. The method of claim 1 wherein said dynamic viscosity begins to increase at a rate greater than 2½ percent.

4. The method of claim 1 wherein said approximation of said standard indication lies within plus or minus 5% thereof when measured in centipoises.

5. The method of claim 1 wherein said conversion supplies a viscosity indication as an inverse of the product of said ram velocity and position as modified by a multiplying factor for a given mold, said factor being a signal representing the physical characteristics of such mold.

6. The method of claim 1 wherein said minimum viscosity is measured as a function of total flow length of the sample under test.

7. The method of claim 1 wherein the size of the sample is small such that total flow length is predetermined to a known constant length prior to test.

8. The method of claim 1 wherein the mold used to perform the test has been calibrated by a standard viscosity fluid and a mold constant characteristic is introduced in said conversion as a multiplicative function.

9. A method of measuring viscosity of a thermosetting plastic compound using a molding press with a ram including in combination,
    subjecting a thermosetting plastic compound to be measured to a molding operation and measuring ram velocity, ram position and elapsed time during such operation, indicating total flow length after said operation, supplying signals of said measurements and said total lengths to a converter, introducing a constant signal into said converter which is indicative of mold characteristics, and said converter being responsive to received signals to supply a signal indicative of dynamic viscosity.

References Cited

UNITED STATES PATENTS

| | | | |
|---|---|---|---|
| 2,780,096 | 2/1957 | Noble et al. | 73—150 |
| 3,053,081 | 9/1962 | Raschig et al. | 73—56 X |
| 3,203,225 | 8/1965 | Sieglaff et al. | 73—56 X |
| 3,360,986 | 1/1968 | Rothschild | 73—56 |

FOREIGN PATENTS 148,267  6/1961  Russia.

LOUIS R. PRINCE, Primary Examiner

J. W. ROSKOS, Assistant Examiner